US010003964B1

(12) United States Patent
Blintsov et al.

(10) Patent No.: US 10,003,964 B1
(45) Date of Patent: Jun. 19, 2018

(54) METHOD FOR SENDING SECRET MESSAGES BETWEEN MOBILE DEVICES

(71) Applicant: Acronis International GbmH, Schaffhausen (CH)

(72) Inventors: Sergey Blintsov, Moscow (RU); Vitaly Halenchyk, Moscow (RU); Stanislav S. Protasov, Moscow (RU); Serguei M. Beloussov, Singapore (SG); Kirill Davydov, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 124 days.

(21) Appl. No.: 15/081,850

(22) Filed: Mar. 26, 2016

Related U.S. Application Data

(60) Provisional application No. 62/147,229, filed on Apr. 14, 2015.

(51) Int. Cl.
| | | |
|---|---|---|
| *H04W 12/02* | (2009.01) | |
| *H04M 1/673* | (2006.01) | |
| *H04L 29/06* | (2006.01) | |
| *H04L 9/08* | (2006.01) | |
| *H04W 12/04* | (2009.01) | |

(52) U.S. Cl.
CPC .......... *H04W 12/02* (2013.01); *H04L 9/0819* (2013.01); *H04L 9/0825* (2013.01); *H04L 9/0866* (2013.01); *H04L 63/0428* (2013.01); *H04L 63/0435* (2013.01); *H04L 63/0442* (2013.01); *H04L 63/061* (2013.01); *H04L 63/065* (2013.01); *H04M 1/673* (2013.01); *H04W 12/04* (2013.01)

(58) Field of Classification Search
CPC ....... H04W 12/02; H04W 12/08; G06F 21/60; H04L 63/0428
See application file for complete search history.

(56) References Cited

U.S. PATENT DOCUMENTS

| | | | | |
|---|---|---|---|---|
| 9,294,476 | B1* | 3/2016 | Lurey | ................. H04L 63/0861 |
| 2003/0009670 | A1* | 1/2003 | Rhoads | ................. G06T 1/0021 |
| | | | | 713/176 |
| 2003/0140235 | A1* | 7/2003 | Immega | ................. G06F 21/32 |
| | | | | 713/186 |
| 2004/0260921 | A1* | 12/2004 | Treadwell | ............... H04L 51/04 |
| | | | | 713/150 |

(Continued)

*Primary Examiner* — David J Pearson
(74) *Attorney, Agent, or Firm* — Michael Fainberg; Arent Fox LLP

(57) ABSTRACT

A method for exchanging hidden secret messages includes generating a masking message comprising a quick phrase on a sender's mobile device; receiving a secret message and associating it with the masking message; encrypting the masking message; encoding the secret message using invisible symbols and embedding it into the masking message; sending the masking message to a recipient; receiving a response masking message from a recipient's mobile device; copying the response masking message and detecting the secret message by checking a clipboard content; decrypting the response masking message; and decoding the secret message and rendering it on a sender's keyboard screen. The secret message contains an invisible marker inserted after a first symbol of the masking message for detection and decoding.

20 Claims, 19 Drawing Sheets

(56) References Cited

U.S. PATENT DOCUMENTS

| | | | | |
|---|---|---|---|---|
| 2014/0025952 A1* | 1/2014 | Marlow | ............. | H04L 63/0428 |
| | | | | 713/168 |
| 2014/0157441 A1* | 6/2014 | Georgiev | ................ | G06F 21/10 |
| | | | | 726/32 |
| 2014/0304508 A1* | 10/2014 | Murphy | .................. | H04L 51/24 |
| | | | | 713/168 |
| 2015/0350250 A1* | 12/2015 | Brander | .................. | H04L 63/20 |
| | | | | 726/1 |
| 2016/0360402 A1* | 12/2016 | Park | ...................... | H04W 12/02 |
| 2017/0201852 A1* | 7/2017 | Kuang | .................. | H04W 4/008 |

* cited by examiner

HIDDEN MESSAGES
KEYBOARD

Invite Friends

Quick Phrases

Settings

Guide

METHOD FOR SENDING SECRET MESSAGES BETWEEN MOBILE DEVICES

CROSS-REFERENCE TO RELATED APPLICATIONS

This application is a non-provisional of U.S. Patent Provisional Application No. 62/147,229, filed on Apr. 15, 2015, the entire contents of which are hereby incorporated by reference.

BACKGROUND

Field

This disclosure relates to a method for exchanging secure messages between mobile devices, and more particularly, to sending hidden messages between mobile devices.

Description of the Related Art

A modern trend for sending messages on mobile phones instead of making phone calls presents some challenges with regard to security and privacy of these communications. The following problems are exemplary:
- private messages are visible via push-notifications on the locked screen;
- private messages are visible in the messaging history;
- hiding of private messages requires a switch to a specialized messenger application.

Furthermore, private messaging can only be used within a single messenger set up for this purpose. There are no applications that can be used with any messenger or chat system in order to make it private. Also a conventional private messaging that can be installed on a mobile device reveals the fact that the user is actually hiding his communications.

Accordingly, it is desired to have a method for hiding user private messages regardless of a type of a messenger application employed by a user. It is also desired to have user secret messages masked within user's messenger application and hidden under some common phrases.

SUMMARY

Accordingly, the present disclosure is directed to a method for to sending hidden messages between mobile devices using some common phrases that substantially obviates one or more of the disadvantages of the related art.

In one embodiment, a mobile application that allows for keeping mobile user messaging private is provided. Messages become invisible for outsiders who gained access to a user's Smartphone. The secret messaging is secure for both a single accidental glance and for a planned attack. The secret messaging application extends an ordinary text message by a hidden part that is visible only for the user and his respondent. These hidden texts are shown neither in the message history nor on the lock screen.

The secret messaging application makes private chatting possible within nearly any existing messenger or chat application adopted for a Smartphone. To see the secret text under some public common phrases, a user needs to activate a special keyboard with a password. The secret messaging application combines ease of use (no need for an extra messenger) and confidentiality (no secret messages displayed in history or on a locked screen).

Additional features and advantages of the disclosure will be set forth in the description that follows, and in part will be apparent from the description, or may be learned by practice of the aspects of the disclosure. The advantages of the aspects described in the disclosure will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the various aspects described in this disclosure and are incorporated in and constitute a part of this specification, illustrate embodiments of the invention and together with the description serve to explain the principles of the invention.

DETAILED DESCRIPTION OF THE PREFERRED EMBODIMENTS

Figure 1:
FIG. 1 illustrates a main screen shot of the secret messaging application.
Figure 1:
Figure 1:
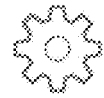
Figure 1:

Reference will now be made in detail to the preferred embodiments of the present disclosure, examples of which are illustrated in the accompanying drawings.

Aspects of the present disclosure is directed to a method for exchanging secure (hidden) messages between mobile devices. A mobile application that allows for keeping mobile user messaging private is provided. This application is used with existing messengers. The messages become invisible for outsiders who gained access to a user Smartphone. The secret messaging is secure for both a single accidental glance and for a planned attack. The secret messaging application extends an ordinary text message by a hidden part that is visible only for the user and his respondent. These hidden texts are shown neither in the message history nor on the lock screen.

The secret messaging application makes private chatting possible within nearly any existing messenger or chat application adopted for use on a Smartphone. To see the secret text hidden under some publicly visible common (and generally harmless or meaningless) phrases, a user needs to activate a special keyboard with a password. The secret messaging application combines the ease of use (no need for an extra messenger) and confidentiality (no secret messages visible in history or on the locked screen). Note that the chat can include more than two participants, and in this case key exchange need to be implemented in such a way that users can read common messages, and implement addition of new users to chat, and drop out of a user from the chat with a replacement of key used in the chat. The encryption key could be periodically or aperiodically updated due to a timer, external events or any other reason.

An exemplary embodiment is useful for keeping user privacy and protecting user correspondence. The secret messaging application keeps user privacy with a two-level protection. According to the exemplary embodiment, access to messages is restricted by a password. An algorithm for data encoding in special unprintable UTF8 characters is used. Message encryption with the DES encryption is also optionally implemented. The exemplary embodiment uses iOS and Android (or similar) full copy keyboards. Optionally, the secret messaging application does not store user messages. The user data is kept only by messengers used for private chats using the secret messaging application.

To install the exemplary security application, a user can simply go to www.***kiboapp.com and click on the link or acquire it from the app store on his phone. After installing the secret messaging application and starting it by tap on the icon, a new user is welcomed by a starting guide. An introduction video helps users to understand how to use the secret messaging system. The guide shows how to enable the special keyboard in operation system settings. The custom keyboard of the secret messaging system is provided inside the installation package. According to the exemplary embodiment, the keyboard provides the functionality and the features used to hide and unhide messages inside the chats and inside the texts.

The secret messaging keyboard is especially useful in messengers and any chat applications because of invisibility of hidden portions on chat application screens and inside of system notifications. In order to hide something inside a user message, a user can enter his "public" message into a usual input field of any messenger application (or select from any number of such public messages available), and then type his hidden message inside a text field of the secret messaging application keyboard. The hidden part is attached automatically to a regular (i.e., masking/public) message. The user can send the message or save it securely.

According to the exemplary embodiment, to read a hidden part of a message or a text one should copy it to a system clipboard. Usually, it can be done by double tapping or pressing on the text or the message. If there is a hidden part inside of a copied message, it will show up in a popup view inside the keyboard. Note that if a user uses the secret messaging keyboard in conversation with somebody, the recipient should also have the secret messaging application (with the keyboard extension) installed for reading the hidden messages. According to one embodiment, the messages are hidden and no one can see them unless he or she knows they exist. In this case, the secret messaging system allows the user to protect the hidden messages by setting a password or a biometric identifier such as fingerprint authentication (e.g. touch-ID®). After this, reading of the hidden messages is only possible after entering a password inside the keyboard or after performing a finger scan. In one embodiment, a functionality of quick phrases helps users to insert predefined texts into input text field. According to the exemplary embodiment, a list of public messages corresponding to the hidden secret messages is stored on a separate server (i.e., www.***parse.com).

The list includes message IDs, encrypted secret messages and fields for verifying the user permissions. The IDs are hidden inside the user text. The hidden text can be added using a special alphabet or unreadable symbols. Note that the message mapping table is not required. In one embodiment, the entire hidden text is not sent because some messengers block long strings of invisible symbols. Instead, a ten-symbol ID of this text is sent. Thus, only ten invisible symbols are encoded into a visible message. The secret message corresponding to the ten-symbol ID can be retrieved by the recipient from the server database. The recipient authenticates himself to the server confirming that the message receipt time is later that the sent time. The server also determines that the message is requested for the first time. Any subsequent access attempts will be blocked. Note that the secret message is stored on the remote sever (e.g., www.***parse.com) in encrypted form. This secret message is decrypted after a user enters a touch ID or a password.

It allows for focusing on hidden messaging and filling out a chat with fake (for public consumption) phrases. Also, the quick phrases list can contain frequently used texts such as names, phone numbers, email and etc. In one embodiment, some of the standard phrases can be linked to particular hidden messages. This way a user can only select a quick phrase and the corresponding hidden message is attached automatically. According to the exemplary embodiment, the custom quick phrases can be added without associated secret messages and the user can link the secret messages to these phrases later.

In order to see a quick phrases list, a user can press the "book" button on the keyboard. To edit this list a user should open the host application. It can be done right from the keyboard by pressing a "pencil" button. According to the exemplary embodiment, a user can invite a friend(s) to use the secret messaging application directly from the keyboard or using the secret messaging host application. To send an invite from the keyboard without leaving user's favorite messenger, the user can just use a special quick phrase "Install Kibo to read my hidden messages" with a URL pointing to the App Store inside. Alternatively, a user can open the host application, select "Invite Friends" and choose a contact from user's contact list or even invite somebody by his phone number.

According to the exemplary embodiment, a user can send hidden messages to anyone in his address book, by using any messaging services, such as Viber, WhatsApp, Skype, SMS and iMessage. All messages are delivered through the messaging services the user is already using and which the user trusts. The user can be confident that his hidden messages remain hidden, even when an outsider gains access to his phone or the user uses the phone next to someone who is not trustworthy. The use of quick phrases is very convenient and can speed up the messaging experience. A user can write additional quick phrases and add them to the quick phrase library. Additionally, the user can associate (link) his quick phrases with his hidden messages. In one embodiment, the secret text entered by the user is automatically replaced by a randomly selected phrase from a list of available phrases provided by the secret messaging application. The list can contain an arbitrary number of common phrases in different languages (although from a usability perspective, roughly 30 phrases is usually sufficient). In yet another embodiment, the semantic analysis of the user text is performed and a corresponding quick phrase is selected based on the semantic analysis instead of the random selection.

In one embodiment, the hidden messages are copied into an exchange buffer in order to be displayed when the user copies the visible part of the message and needs to see the hidden part. Additionally, a user can set up a password for reading the hidden messages. This way no one else can see the hidden messages without entering the password first. The password is requested periodically, as set by the user (e.g., every two or three minutes).

According to one exemplary embodiment, the secret messaging application encodes the hidden messages into UTF8 control/unprintable symbols, which do not have a visual representation, but affect the neighboring symbols in a certain way. The exemplary embodiment uses the symbols \U000E0100-\U000E01EF that work with most of the OSs with the most of the available fonts, using a translation table to convert from the control symbols to human-readable symbols. The secret messaging application monitors changes in the exchange buffer and detects a text with a hidden portion inside. Then, the hidden portion is decoded and shown on the keyboard screen. A special marker with unprintable symbols is used. The marker is inserted into the text after the first symbol. The marker contains the data related to the hidden message—i.e., a time of creation of the hidden message, and a length of the message. The marker determines that the message contains the hidden text. Once the marker is detected after the first symbol, the secret messaging application begins decoding the message. In other words, the marker serves as a header of the secret message.

Visible and hidden data is stored in the history of the messenger (local or server based). According to one embodiment, the hidden portion of the message (i.e., encoded data) is inserted after the first symbol of the visible portion of the message. This keeps the secret data from being seen, avoids the artifacts and supports most of the messenger systems. Even if a user has several devices with access to the same message history, the hidden portions can only be seen if the secret messaging application keyboard is installed on the system. The encoding system used by the secret messaging application is supported by all known messengers and chats in iOS™, Android™, Mac OS X™ and WINDOWS™. Not that even if the symbols' artifacts appear in the messenger, nobody can read hidden messages without the secret messaging application, in accordance with the exemplary embodiment.

The secret messaging application uses a symmetric block-cipher encryption of data DES using a key embedded into the application. According to one exemplary embodiment, stickers and images can be used as visible message content that has corresponding hidden messages. This way, a selected image or a sticker can automatically attach the corresponding hidden message. According to the exemplary embodiment emojis (emoji images/symbols) can be used for hiding the secret messages. The exemplary embodiment also provides for screen shot protection. According to the exemplary embodiment, the screenshot protection is implemented by replacement of the invisible (hidden) message by a fake one that appears on the screenshot.

According to one exemplary embodiment, auto correction of quick phrases and matching the quick phrases together into a sensible chain of messages is implemented. In one embodiment, the semantic analysis can be used. However, just a few phrases used randomly are sufficient. The sequence of public messages can be pre-made, downloaded from a server for a specific occasion, selected based on a context (e.g., business vs. non-business, work hours or after work or weekend, geographically dependent, analyses of current logs of messenger, email, social network, Twitter and other sources of local information; other sources may include context analyses using "big data" algorithms and other sources of information, related to the owner of device, current text writer, correspondent, vocabulary, base of text written by the writer, etc.). In one embodiment, the semantic analysis can be used by chat-bots that talk to each other and generate responses based on the incoming phrases and other context information (i.e., current weather, local news or events).

FIG. 1 illustrates a main screen shot of the secret messaging application in accordance with the exemplary embodiment.

Figure 2:
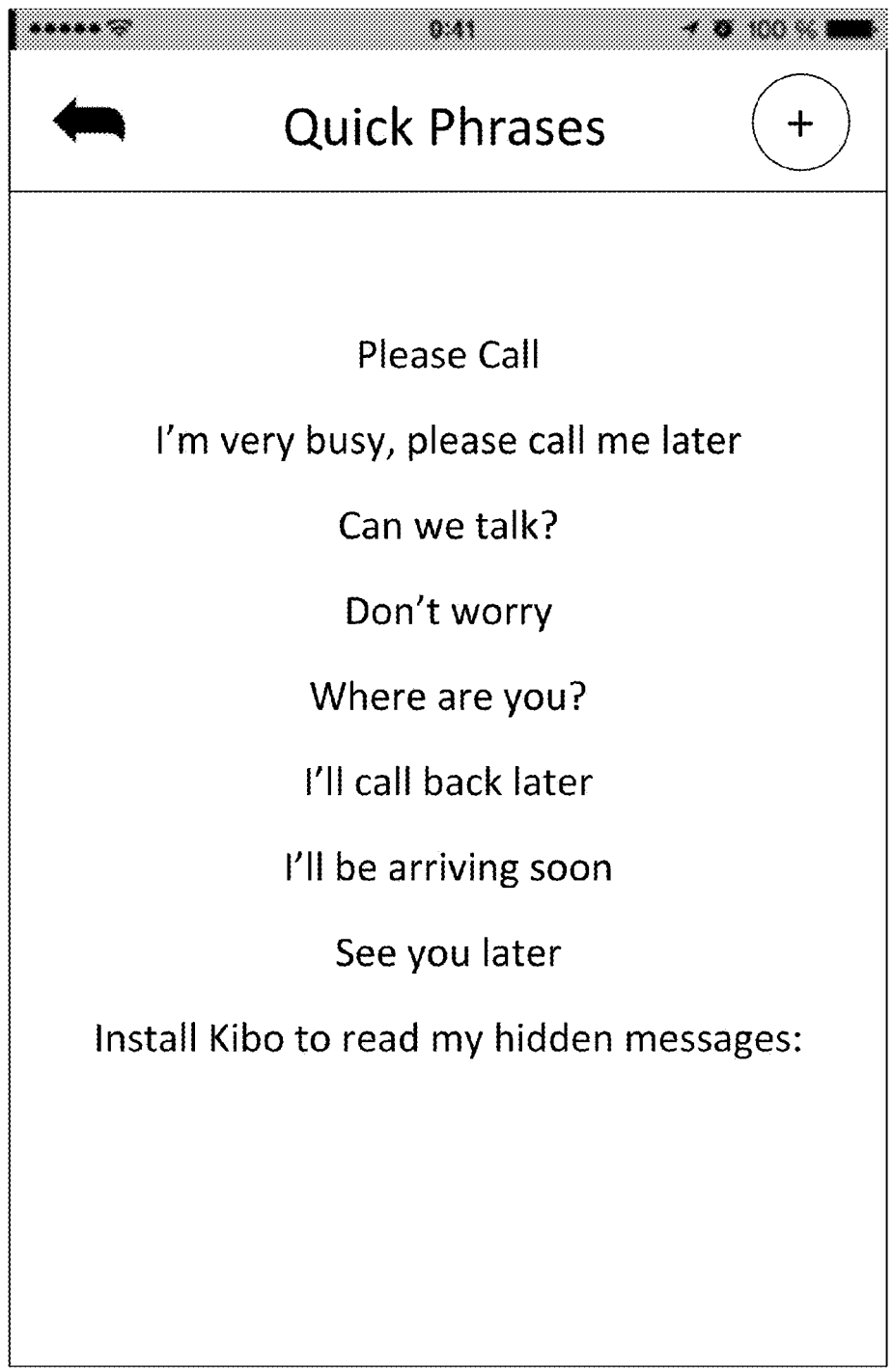
FIG. 2 illustrates a screen for selecting quick messages.

FIG. 2 illustrates a screen for selecting quick phrases.

Figure 3:
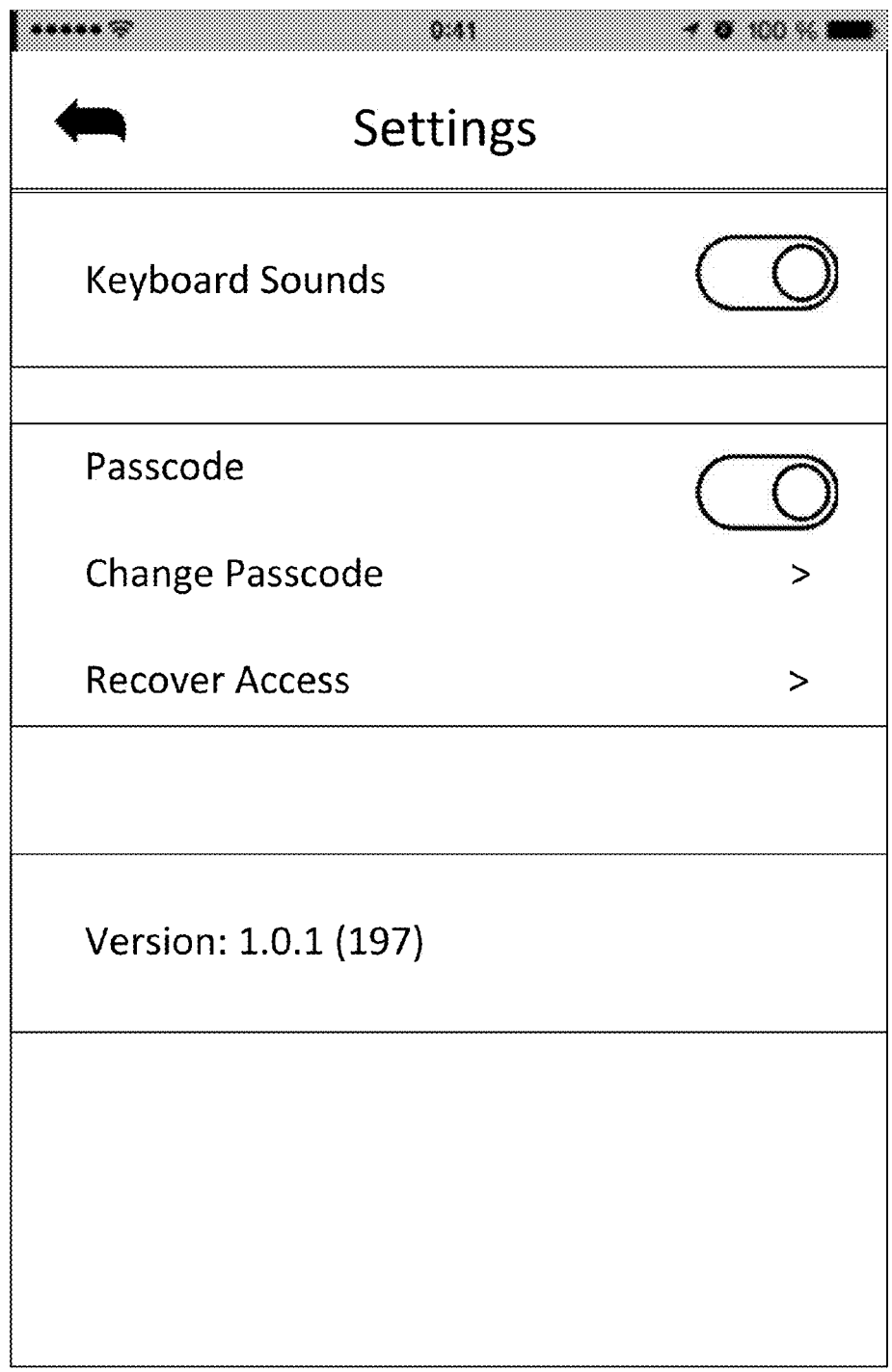
FIG. 3 illustrates a screen shot for settings of the application.

FIG. 3 illustrates a screen shot for settings of the application for exchanging the hidden messages.

Figure 4:
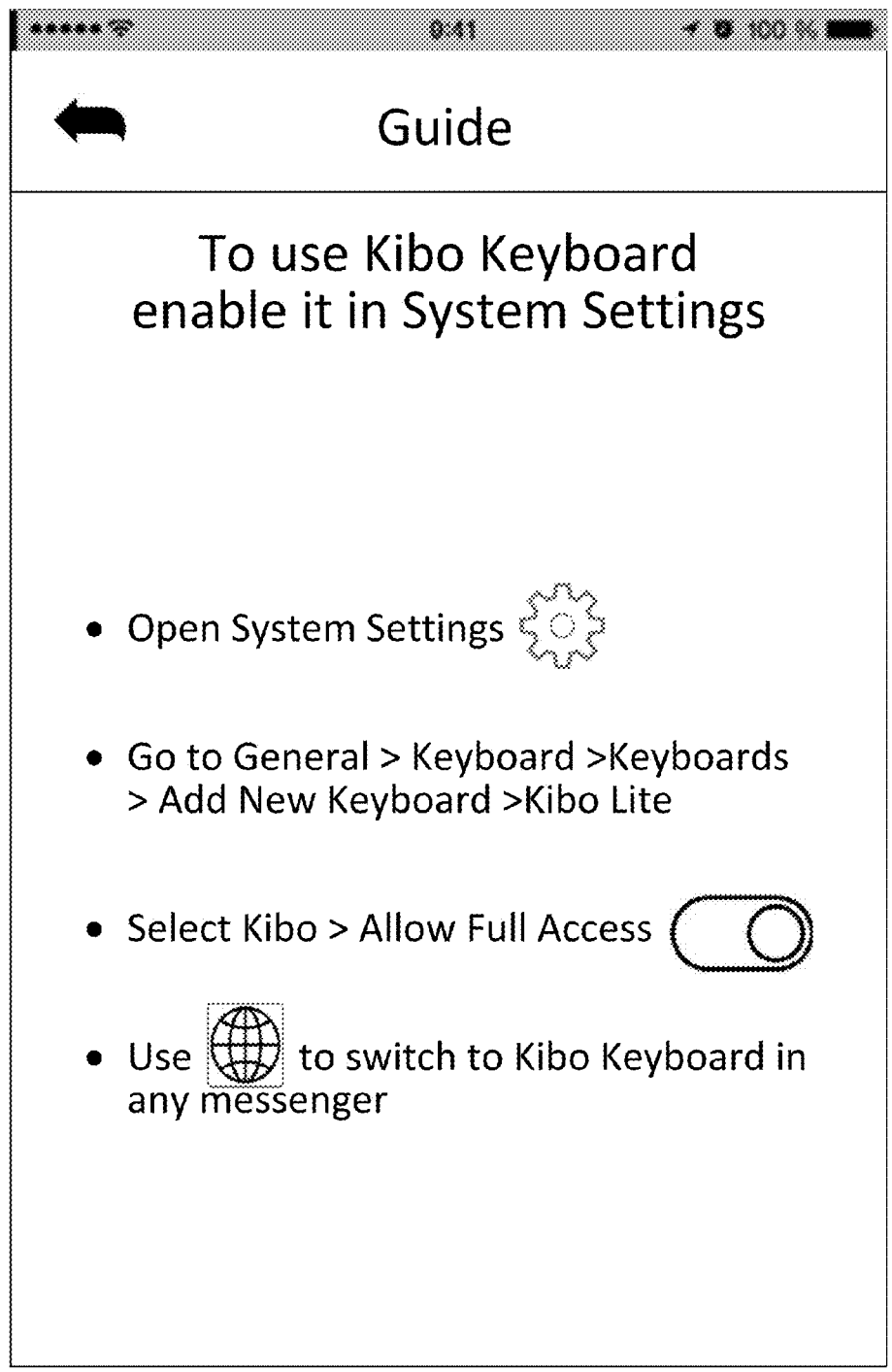
FIG. 4 illustrates a screen for using a keyboard of the secret messaging applications.

FIG. 4 illustrates a screen for using a keyboard of the secret messaging applications.

Figure 5:
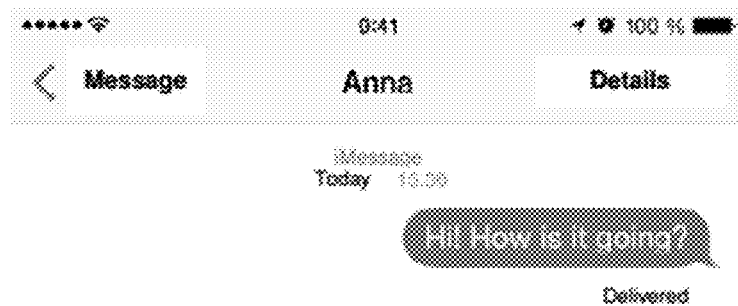
FIG. 5 illustrates a screen shot depicting a text box for entering hidden messages.
Figure 5:
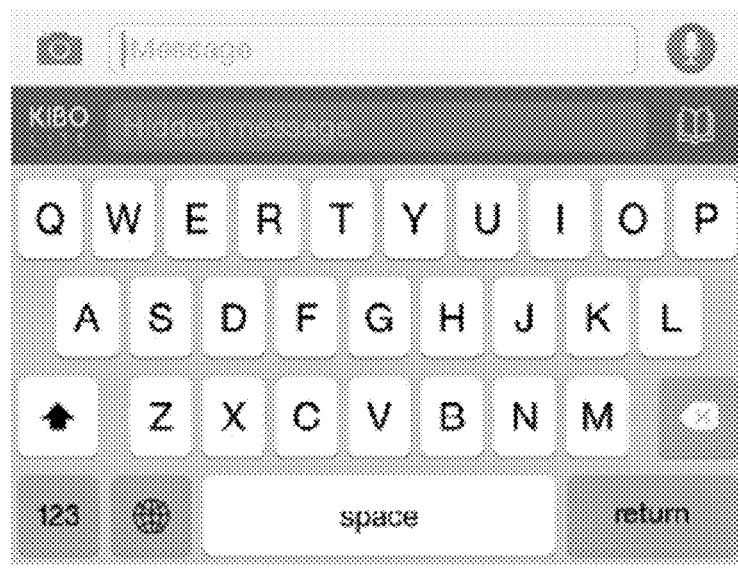

FIG. 5 illustrates a screen shot depicting a text box for entering hidden messages.

Figure 6:
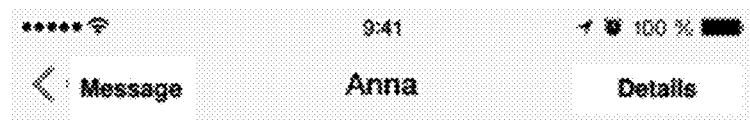
FIG. 6 illustrates a screen shot depicting a list of quick phrases.
Figure 6:
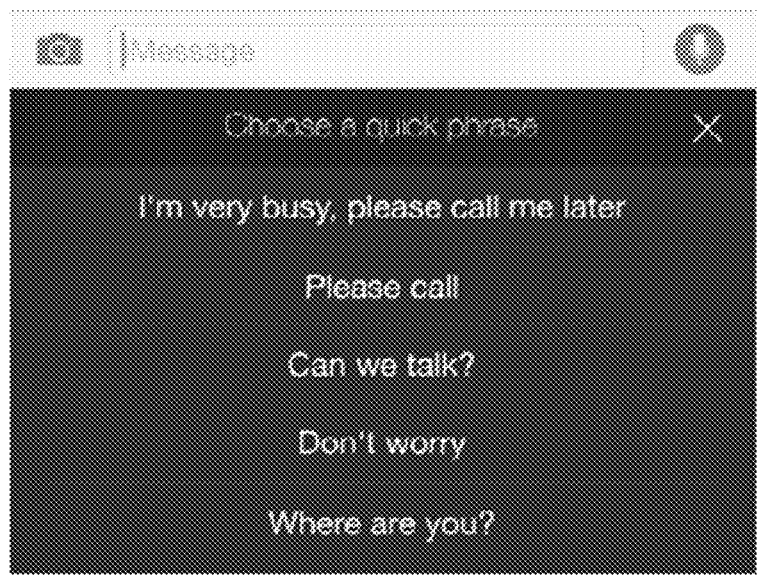

FIG. 6 illustrates a screen shot depicting selection of quick phrases to be used for masking a hidden message.

Figure 7:
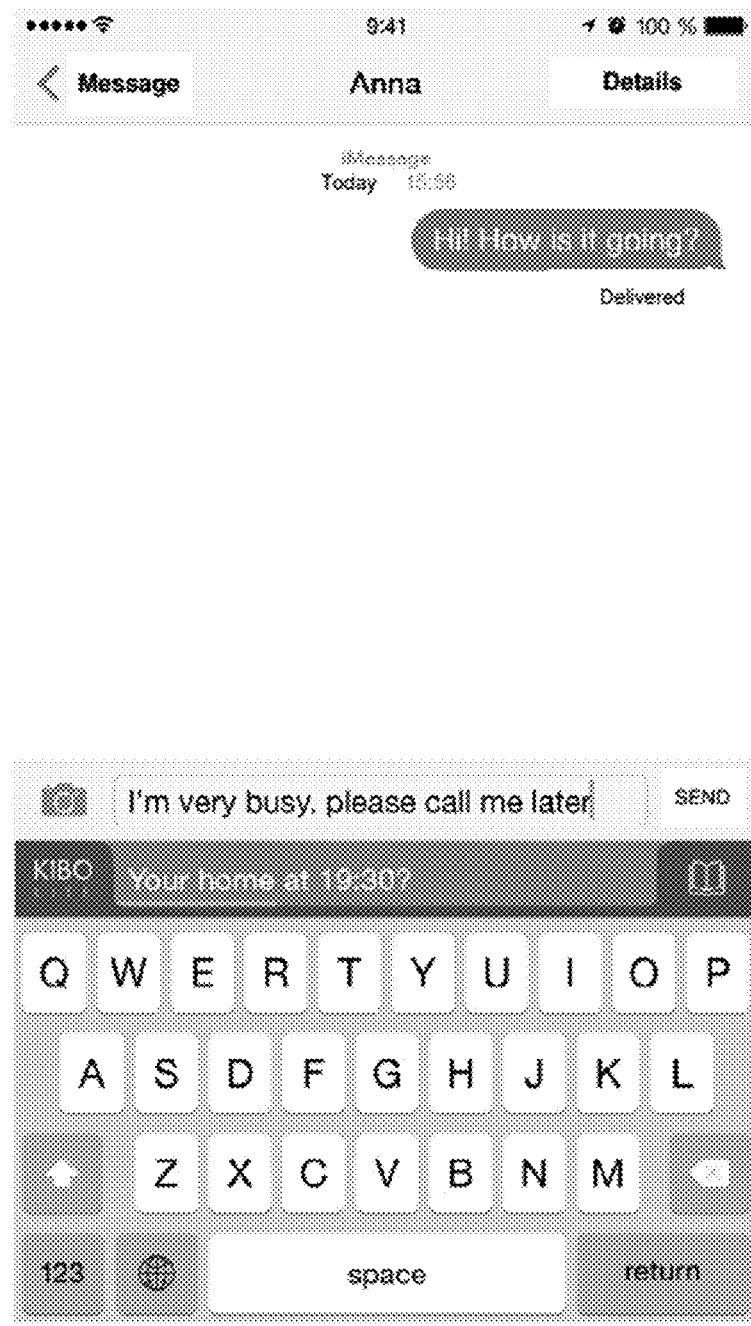
FIG. 7 illustrates a screen shot depicting a keyboard for entering masking messages and hidden messages.

FIG. 7 illustrates a screen shot depicting a keyboard for entering masking messages and hidden messages.

Figure 8:
FIG. 8 illustrates a screen shot for entering a password for reading the hidden messages.
Figure 8:
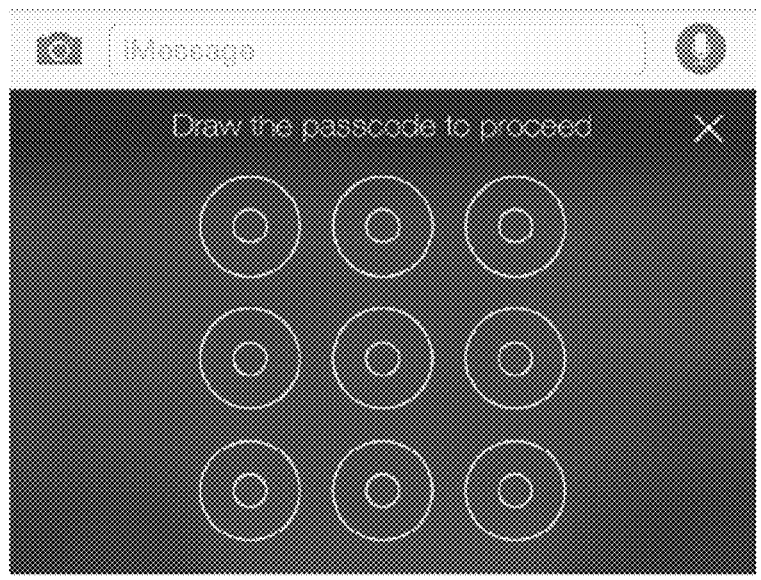

FIG. 8 illustrates a screen shot for entering a password for reading the hidden messages.

Figure 9:
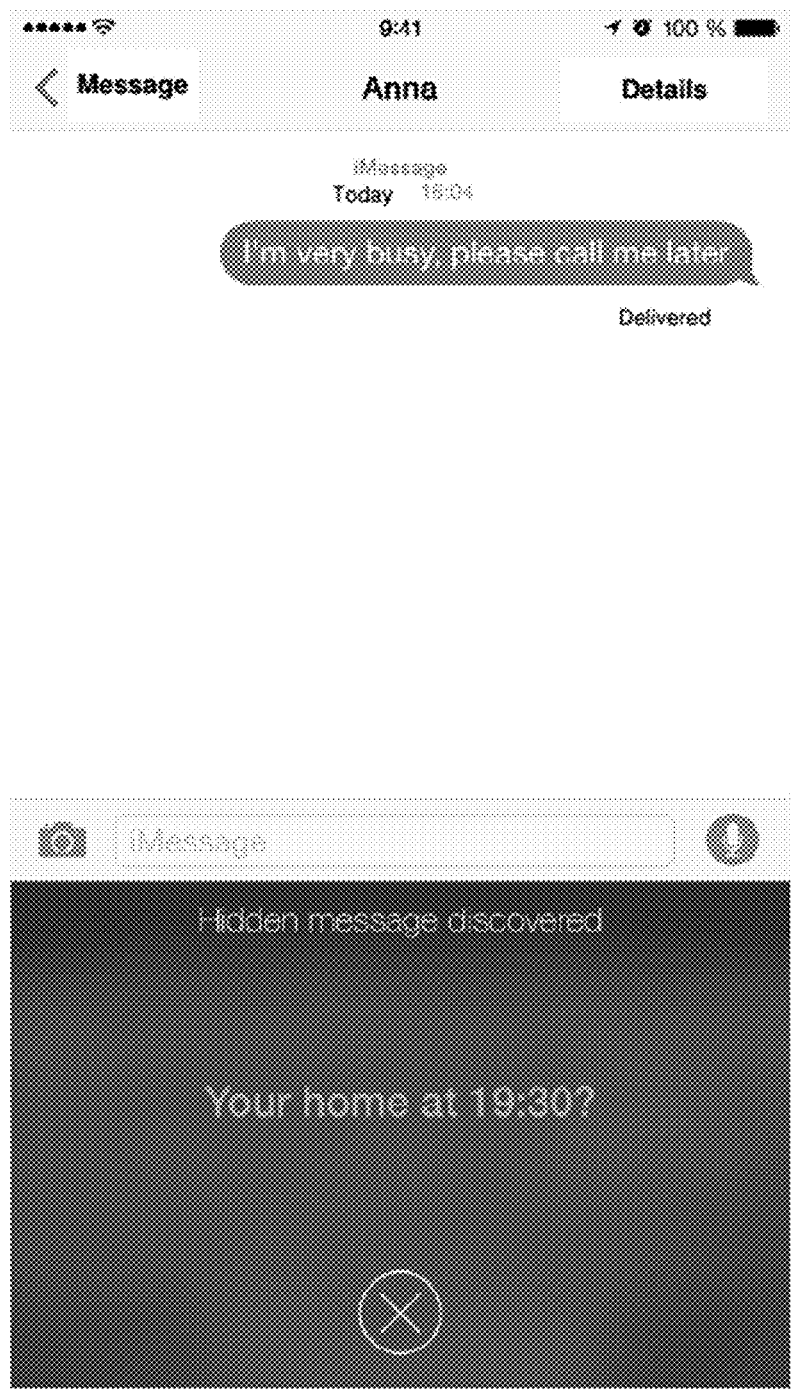
FIG. 9 illustrates rendering of the hidden message after the password is entered.

FIG. 9 illustrates rendering of the hidden message after the password is entered.

Figure 10:
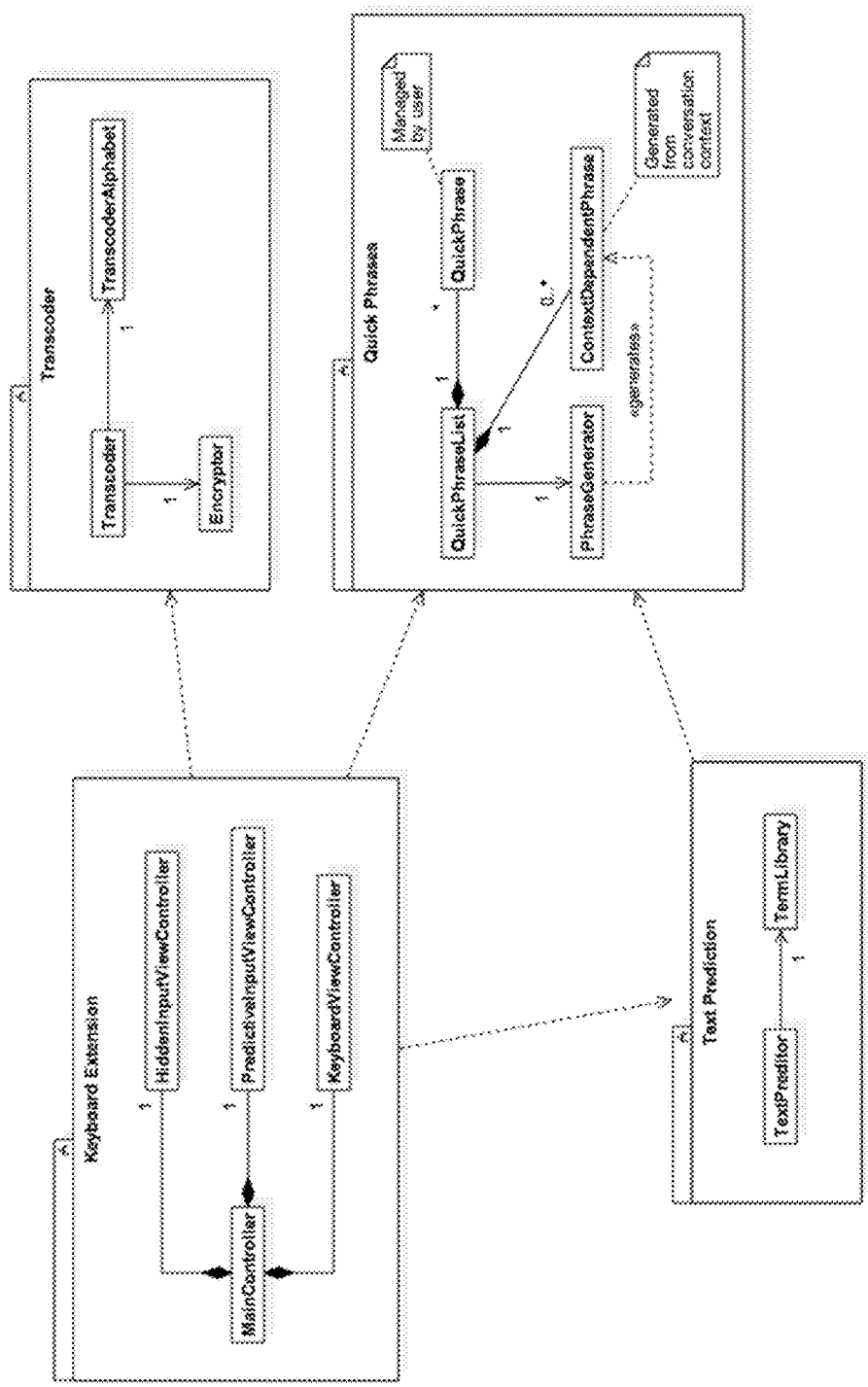
FIG. 10 illustrates system modules.

FIG. 10 illustrates system modules including: a keyboard extension; a transcoder configured to encode the symbols of the hidden messages and encrypt them; a module for processing quick phrases and a text prediction module. The keyboard extension has three main parts: the keyboard itself (provides functionality similar to a native keyboard), the predictive input controller (provides functionality similar to a native predictive input component) and a hidden input controller (provides functionality for hiding content inside public messages).

The hidden input controller uses the transcoder to get the "invisible" representation of a hidden (secret) message that can be embedded into the public message. The transcoder employs an alphabet of UTF8 (for example) control characters to encode a secret message. Prior to encoding, the transcoder can encrypt private message, if the encryption option is turned on. Any number of encryption (symmetric and asymmetric) algorithms can be used, e.g., AES, DES, Blowfish, etc. Every encoded message can start with a marker (a UTF8 control character that is not in the alphabet) followed by a header that includes transcoder version, length, timestamp, sender ID, etc. This header can be extended and/or modified in future versions retaining backward compatibility.

The keyboard extension constantly monitors changes in the system clipboard. If a hidden message marker is found inside the clipboard contents, the transcoder is used to extract the message, decode it and optionally decrypt the message (if it was encrypted). The quick phrases module allows a user to quickly add something to the public text field (a fake phrase or a quick phrase selected from the list). This module can use two main sources of phrases: pre-configured list of quick phrases and dynamically generated phrases provided by a Phrase Generator. As a context for dynamic phrases, the Phrase Generator can use the history of public messages and/or defined topic of conversation. The text prediction module functions similar to a native messenger text predictor except that it can use quick phrases or fake dialogs downloaded from an external server as an additional source of data.

Figure 11:
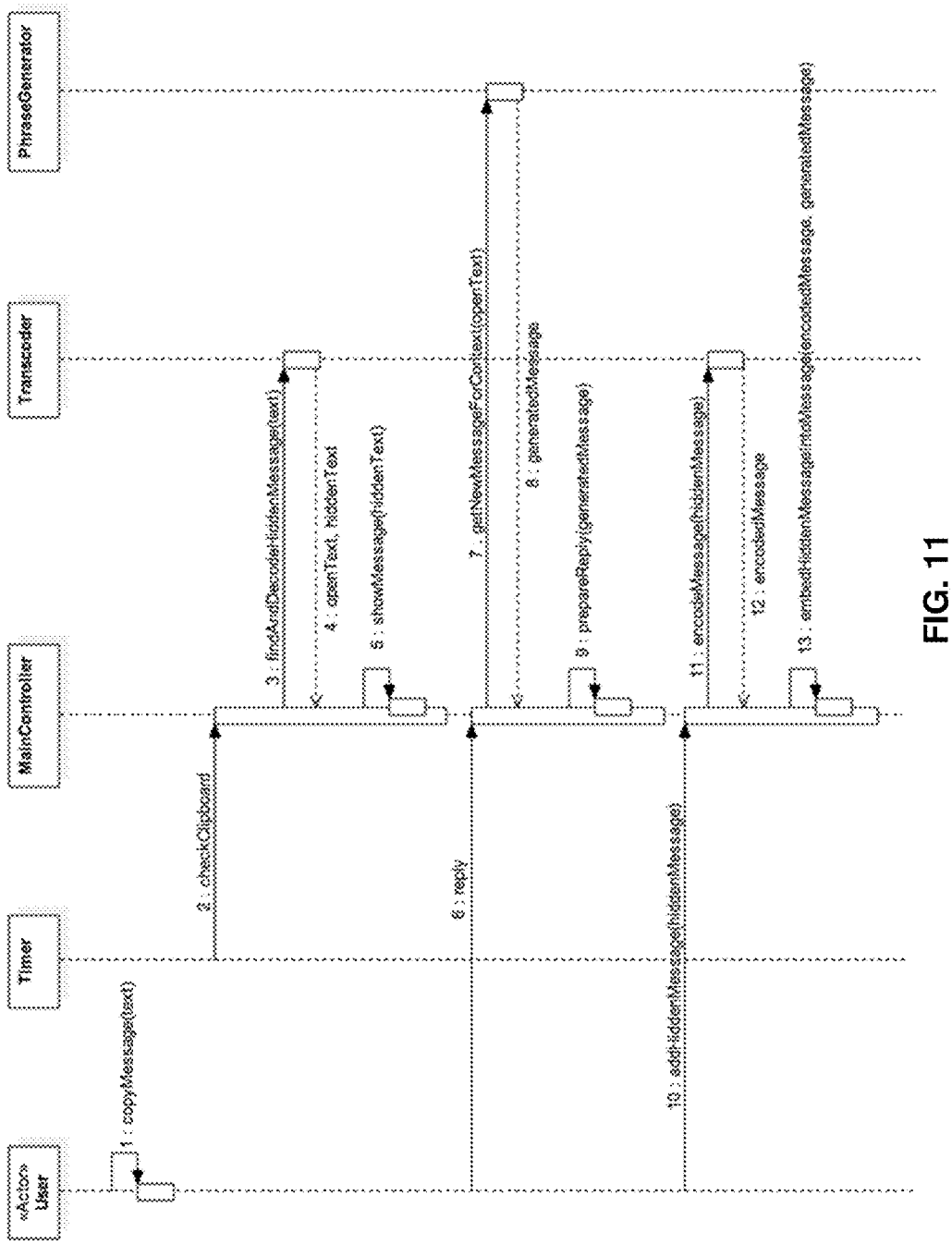
FIG. 11 illustrates a workflow for processing hidden messages.

FIG. 11 illustrates a workflow for processing hidden messages in accordance with the exemplary embodiment. A user copies incoming message to the clipboard. The system uses a timer or intercepts clipboard modification and reacts to it, to periodically check clipboard (e.g., 4 times per second).

The system asks the transcoder to find and decode a private (secret) message, if it is detected. If a hidden message marker is found, the transcoder extracts the message, decodes it and optionally decrypts (if it was encrypted). The system renders the hidden message to the user. If the user decides to reply to this message, the system uses the Phrase Generator to generate a public (fake) reply message using incoming message as a context. The Phrase Generator returns the new masking message. The system suggests the generated message to the user. The user enters his private (secret) message. The system uses the transcoder to encode the private message. The transcoder returns the encoded message. The system embeds the encoded private message inside the public message (after the first character of the public message). The message is ready to be sent at this point.

Figure 12:
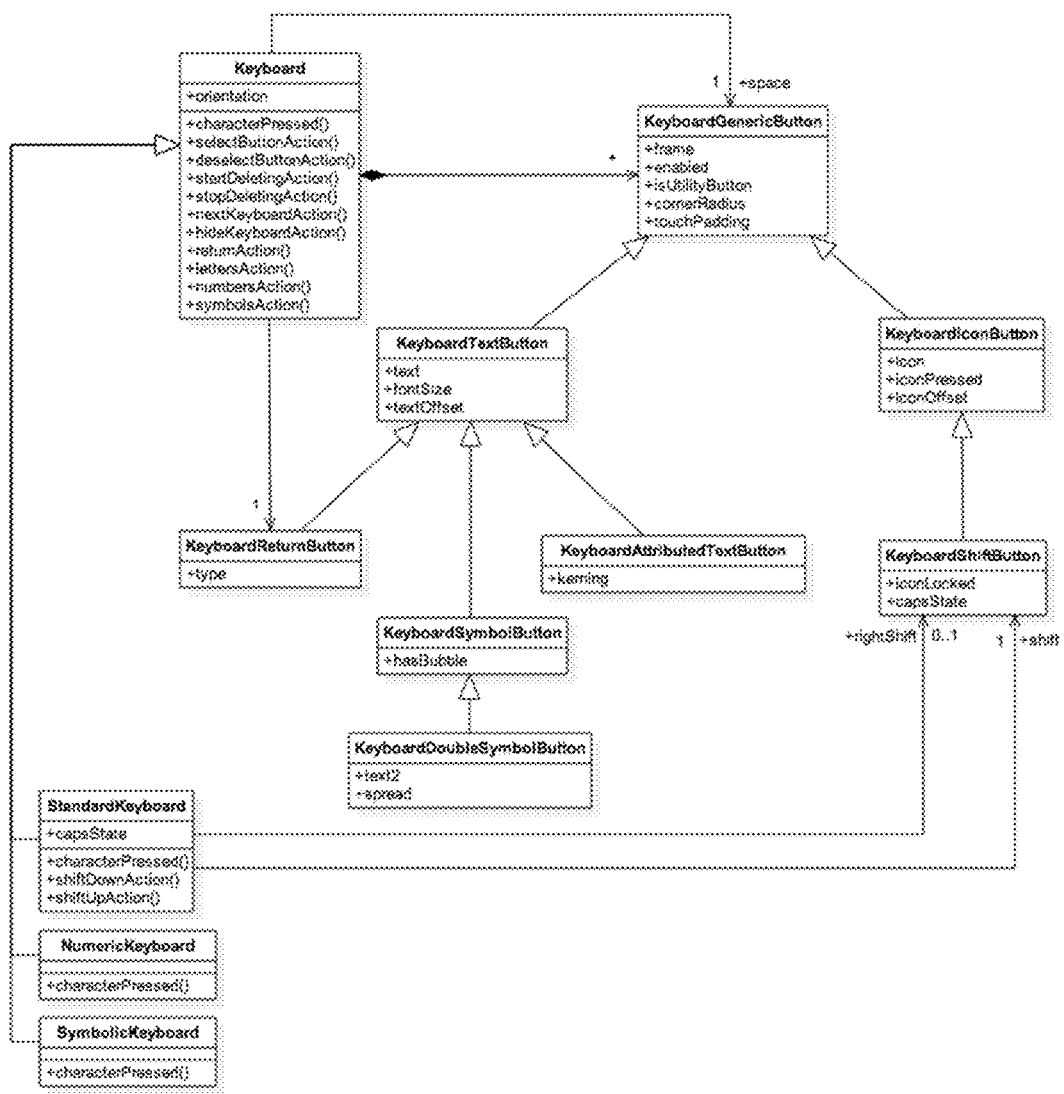
FIG. 12 illustrates interface modules.

FIG. 12 illustrates a model of the keyboard implementation in accordance with the exemplary embodiment. FIG. 12 depicts class-objects of the proposed secret messaging application. The object keyboard has several methods—e.g., orientation, characterPressed, selectButtonAction, etc. The method hideKeyboardAction hides the user message.

Figure 13:
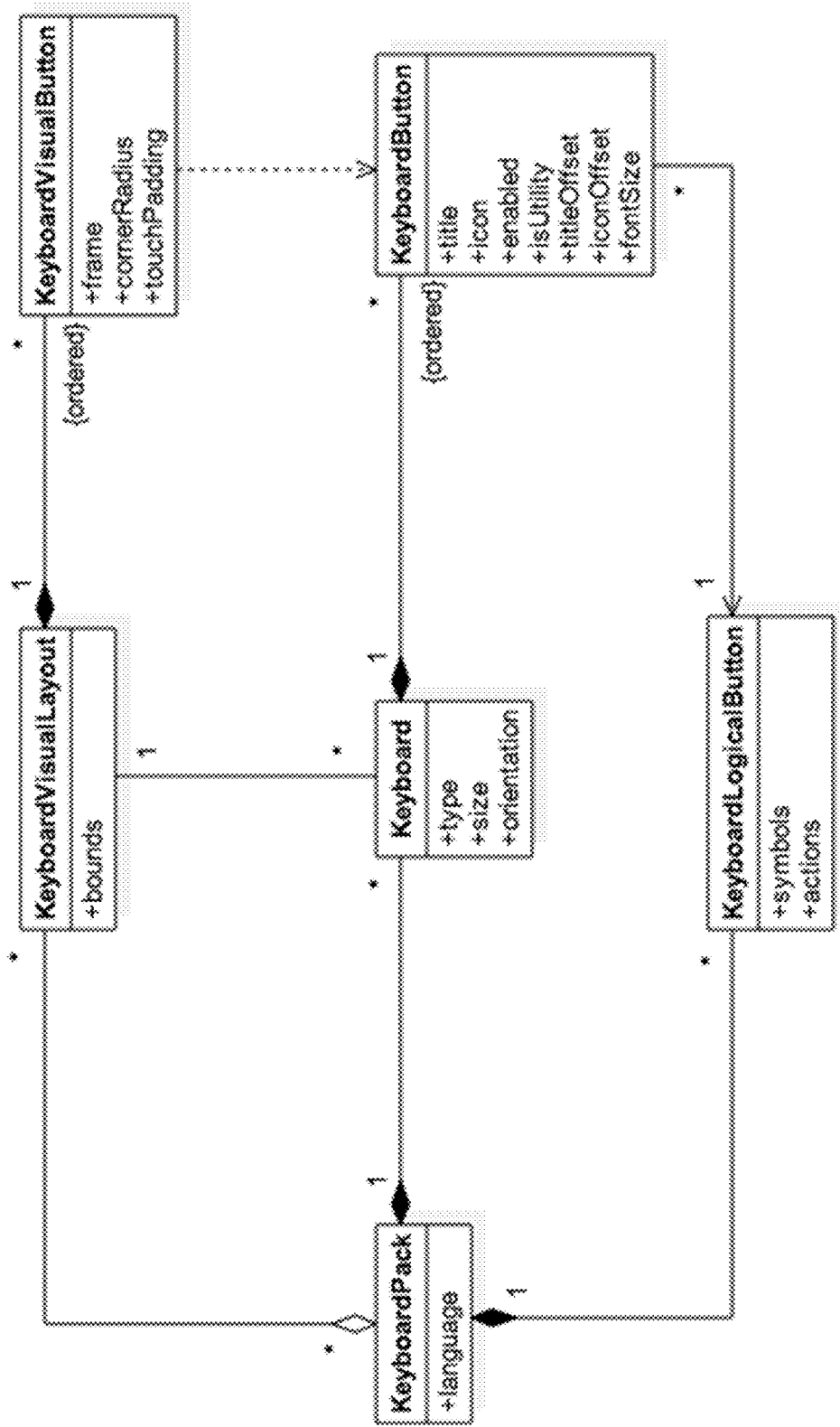
FIG. 13 illustrates operation of the keyboard.

FIG. 13 illustrates a metadata model used to describe the keyboard, in accordance with the exemplary embodiment. The metadata reflects keyboard presenter parameters used, in some aspects of the disclosure, to create a main view of the proposed application keyboard extension. For example, the metadata reflects keyboard language, size, symbols, orientation, boundaries, etc. Once the presenter module receives these keyboard parameters, the keyboard is rendered to a user of the mobile device.

Figure 14:
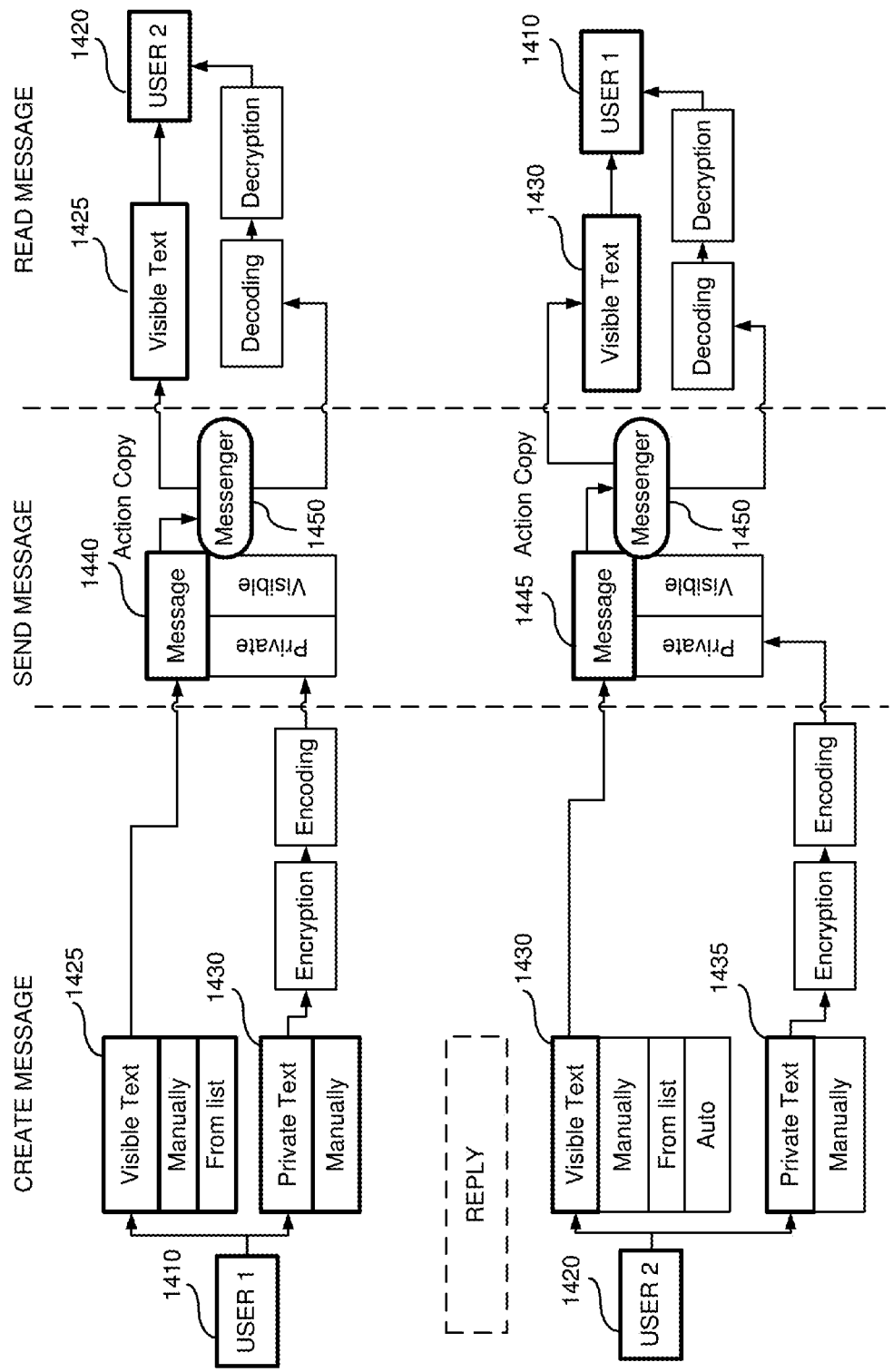
FIG. 14 illustrates a process of exchanging the secret messages between mobile device users, in accordance with the exemplary embodiment.

FIG. 14 illustrates a process of exchanging the secret messages between mobile device users, in accordance with the exemplary embodiment. A user 1410 creates a visible part of a text message 1425. The user 1410 can either enter this text manually or selected it from a list of quick phrases. Then, the user 1410 enters his private text 1430 manually. The private text 1430 is encrypted and encoded. A message 1440 including both a private and a visible part is created and sent via a standard messenger 1450. The message is copied into a user 1420 device. The visible part 1425 is rendered to the user 1420 and the private part 1430 is decoded and decrypted prior to being rendered to the user 1420.

The user 1420 sends a reply by creating a visible text 1430 either by entering it manually, by selecting it from the list or by having the text auto generated based on the context of the received visible text or by semantic analysis. The private text 1435 is entered manually and encrypted and encoded. The message 1445 containing the two parts is sent via the messenger 1450. The message 1445 is copied into user 1410 device. The visible part 1430 is rendered to the user 1410 and the private part 1435 is decoded and decrypted prior to being rendered.

According to one exemplary embodiment, the quick phrases are automatically selected and displayed by the secret messaging application. Thus, a user does not have to select a quick phrase. Additionally, a user can send a message to Facebook™ using www.***parse.com database. This way quick phrase does not contain a hidden message. Instead, it contains an ID of the hidden text stored in the database. The ID can be encrypted for better security. Then, the receiver can decrypt the ID and retrieve the secret text from the database.

According to the exemplary embodiment, the system includes an encryption and encoding module, a special API for integration of the secret message application into standard messengers or chats, a communication channel, a decoder module, a screen (virtual) keyboard and a generator of the inserted text. Alternatively, a keyboard extension can be provided without a need for integration API, because the keyboard extension allows for sending a text into any messenger. The system provides for exchange of messages having a visible part generated by robots (chat-bots) and the secret part either inputted by a user or generated as well using correspondence of the standard quick phrases with the secret messages.

According to the exemplary embodiment, the encoding employs unprintable symbols. In one embodiment, a weak symmetric encryption is used for encryption of the secret messages using the key embedded in the secret messaging application. In another embodiment, a strong asymmetric encryption can be used with a standard key exchange protocol, such as Diffie-Hellman key exchange algorithm. A block cipher encryption or a stream cipher encryption can be used. Asymmetric encryption is more robust, but it requires more computational resources and can be slower, while symmetric encryption is less secure, but faster.

The key exchange can be implemented as a simple private/public or symmetric key exchange. A group key exchange over a common chat can be implemented as well. The key exchange can be implemented using bump technology (i.e., direct contact of mobile devices). The keys can be stored in the device key-chains. As a more secure option, the keys can be stored on the external devices (e.g., USB, Bluetooth, etc.). As another option, PKI infrastructure can be used, cloud systems like iCloud can be used, or the key can be delivered via voice or another secure form of key exchange. As another option, a voice sample from a particular user (or the user's picture) can be used, and a biometric key based on biometric data can be generated. In this case, the user can have a sample of voice or a photo of correspondent or he/she can use a touch touchID pad as a biometrical info source and encrypt data exclusively to him/her without explicit key exchange.

Figure 18A:
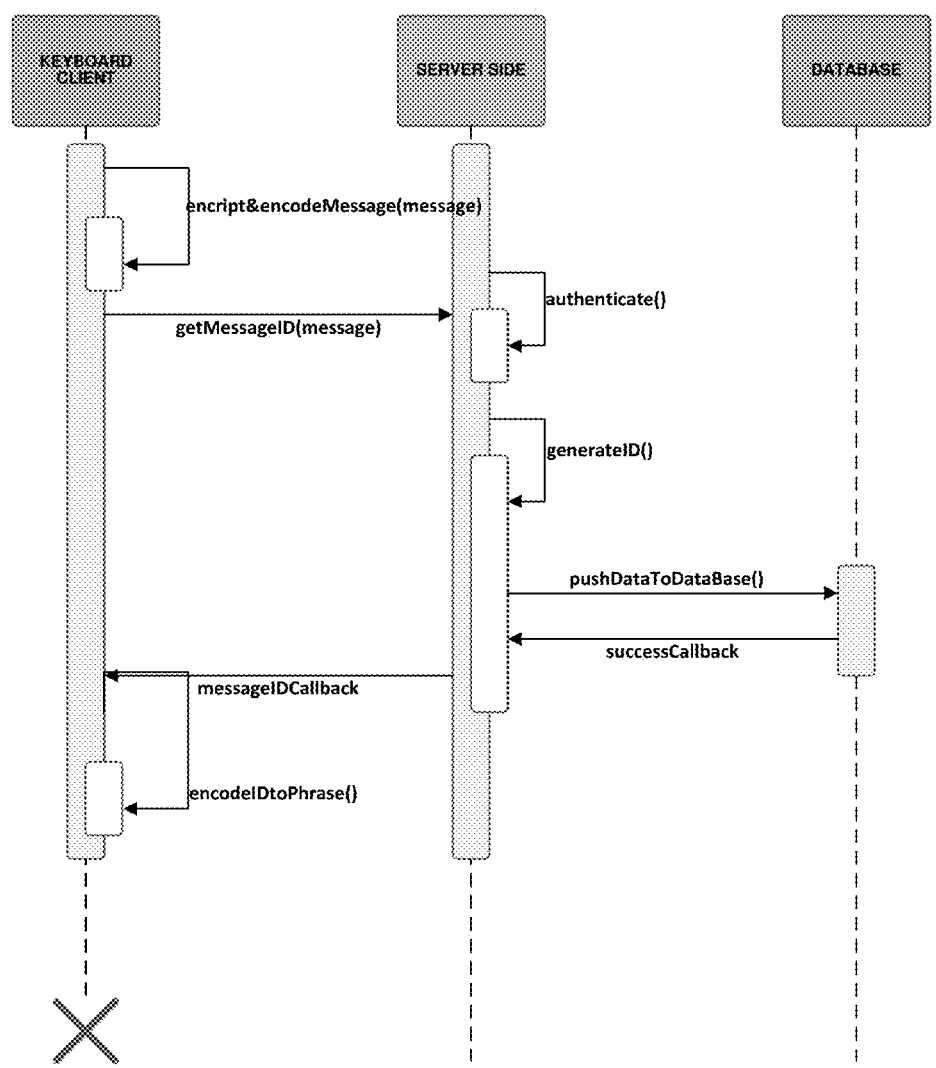
FIGS. 18A, 18B illustrate the steganography embodiment of the disclosure.
Figure 18B:
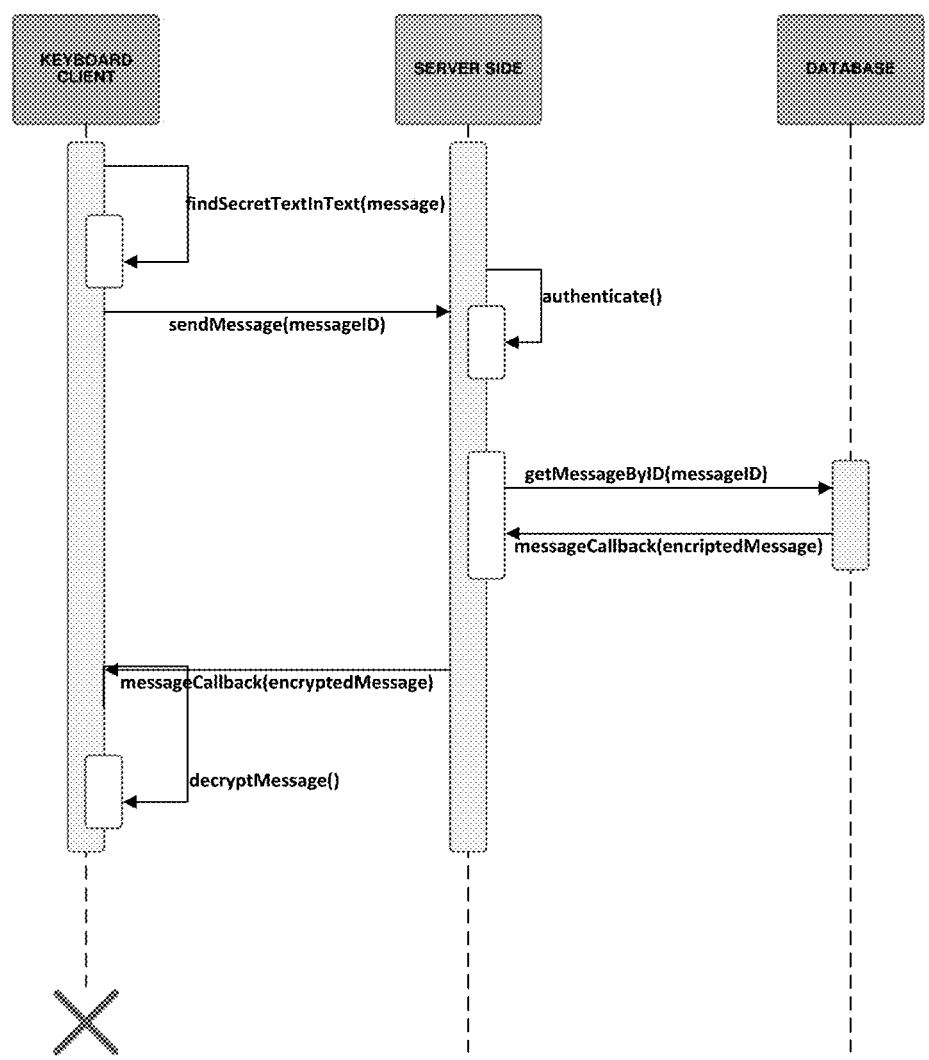

In one embodiment, media files can be exchanged instead of the hidden text. The media files can be user generated or taken from a library. The message can be hidden inside the media file by steganography means, see FIGS. 18A, 18B. In one embodiment, a keyboard can be implemented as an external physical device. In this case, the keys are not stored on the mobile device. The text (or media) is shown on a connected LCD screen or on a device connected to the mobile device as an external module or a Bluetooth device. If a mobile device is a modular device such as Google Project ARA, then one of the modules can provide this functionality as well. According to the exemplary embodiment, the user mobile devices are verified. If the mobile devices are configured with different biometric identifiers (e.g. fingerprint authentication identifiers such as Touch-IDs), the users can send a code describing the identifiers (e.g., Touch-IDs) of each of the devices to each other so this code can be verified upon meeting of the users by pressing a finger on the screen.

Figure 15B:
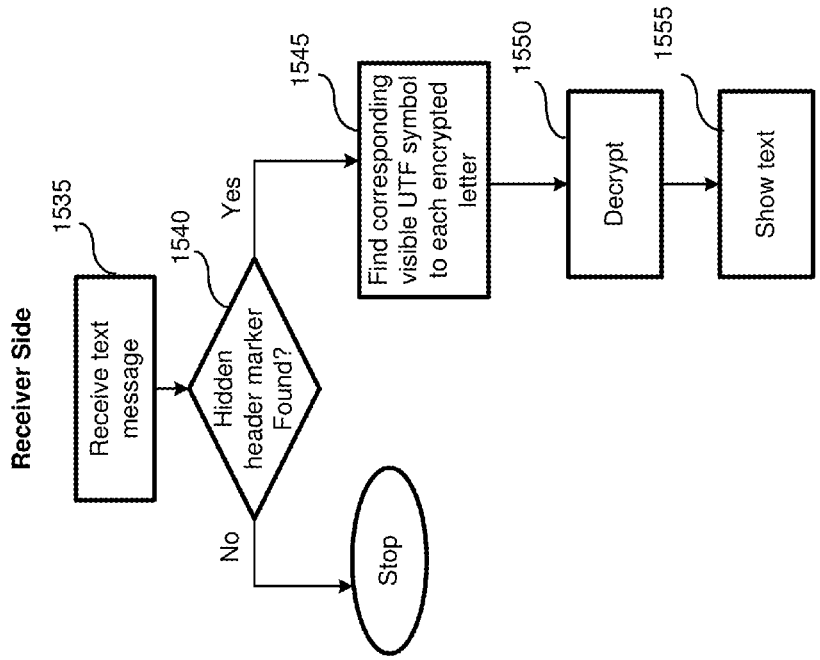
FIGS. 15A and 15B illustrate flowcharts for processing a hidden message on a sender and on a receiver sides, respectively, in accordance with the exemplary embodiment.
Figure 15A:
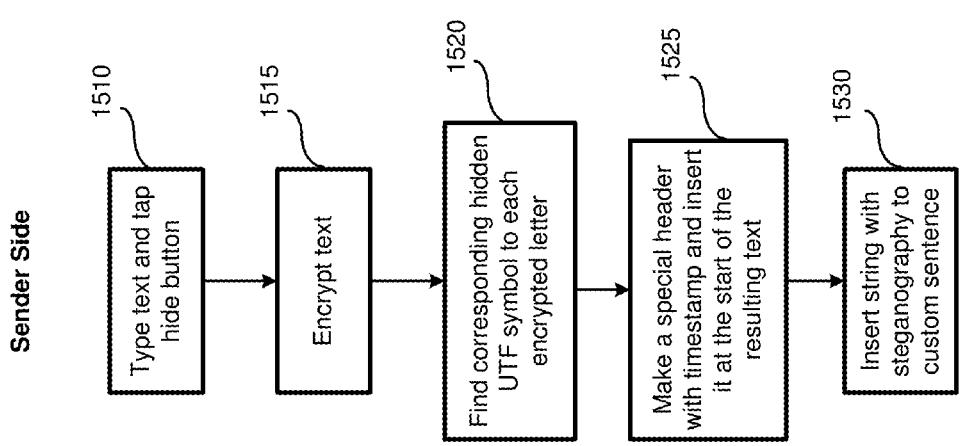

FIGS. 15A and 15B illustrate flowcharts for processing a hidden message on a sender and on a receiver sides, respectively, in accordance with the exemplary embodiment. On a sender side, in step 1510, user types text and taps a hide button. The text is encrypted using an encryption algorithm (e.g., AES or DES) in step 1515. A corresponding hidden UTF symbol is found for each encrypted letter in step 1520. A special header with a timestamp is inserted at the beginning of the resulting text string in step 1530.

On a receiver side, the text message is received in step 1535. If a hidden header marker is found in the text string in step 1540, the secret messenger application finds a corresponding UTF to each of the encrypted letters in step 1550. Otherwise, the process stops. In step 1550, the text string is decrypted and rendered to the user in step 1555.

Figure 16:
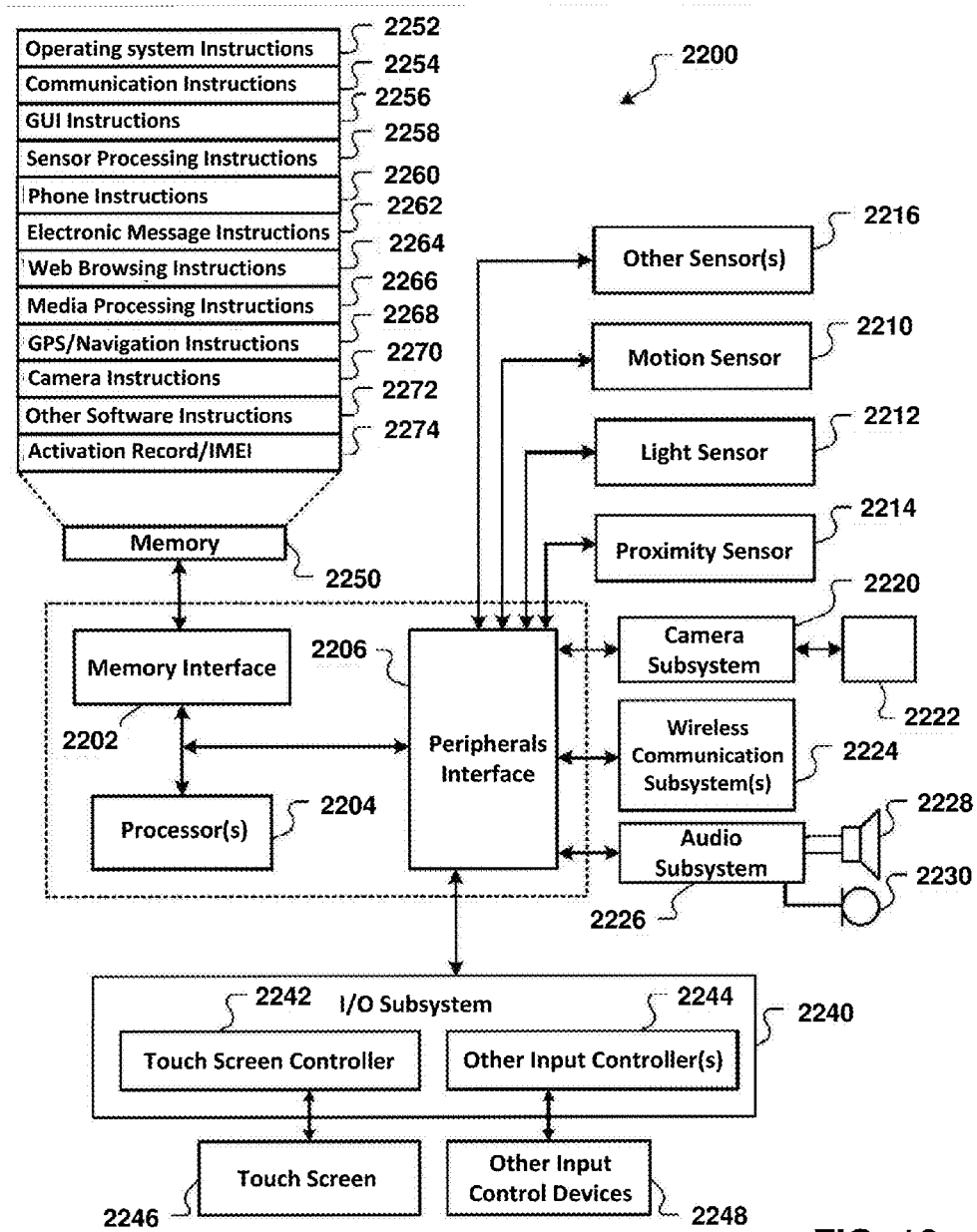
FIG. 16 is a block diagram of an exemplary mobile device that can be used in the aspects of the disclosure.

FIG. 16 is a block diagram of an exemplary mobile device 59 on which the aspects of the disclosure can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 17:
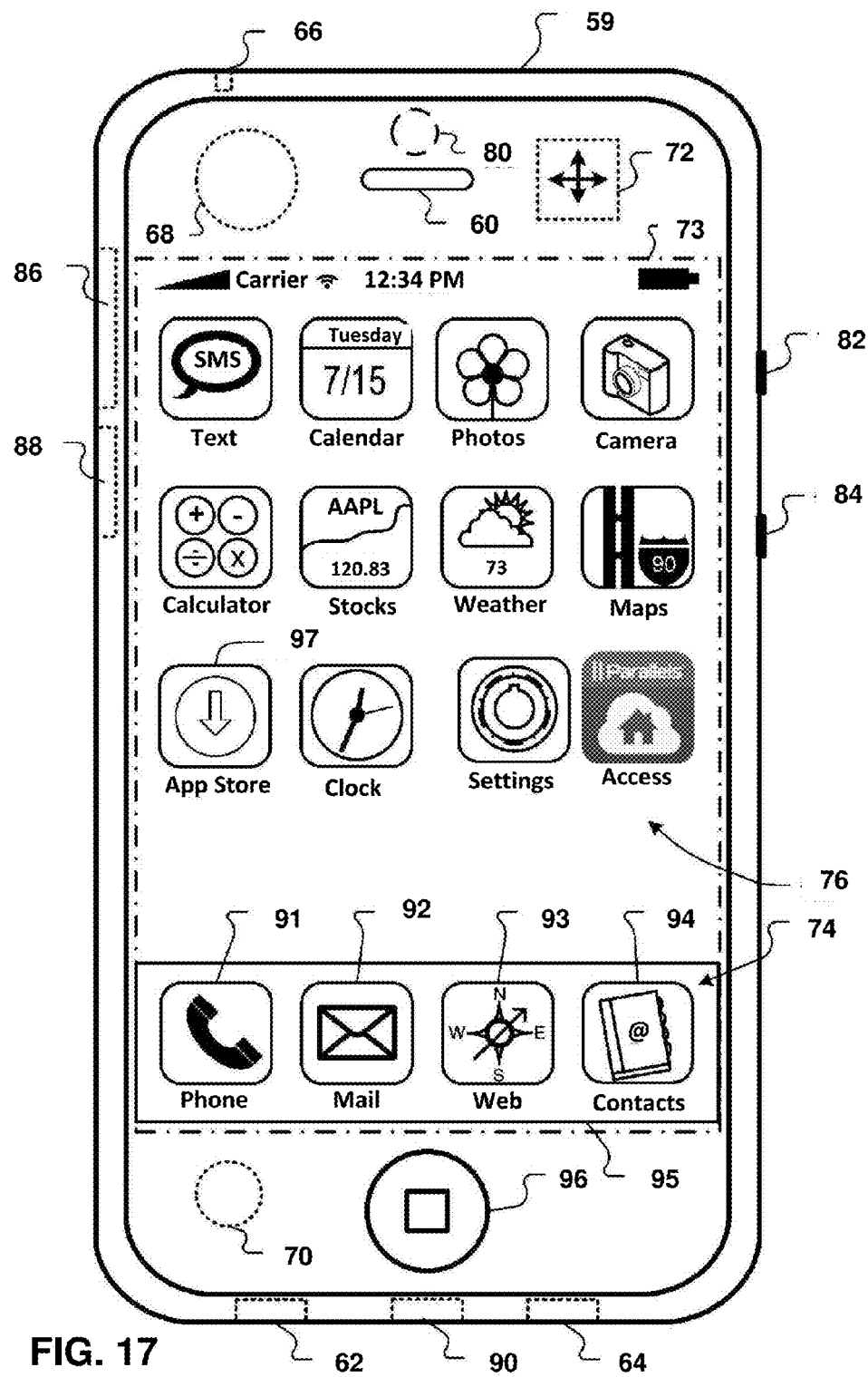
FIG. 17 is a block diagram of an exemplary implementation of the mobile device.

FIG. 17 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions. The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The aspects of the disclosure are further defined by the following claims

What is claimed is:

1. A method for exchanging hidden secret messages, the method comprising:
   generating, on a sender's mobile device, a masking message;
   receiving a secret message and associating it with the masking message;
   encrypting the secret message;
   encoding the secret message using invisible symbols and embedding it into the masking message;
   sending the masking message to a recipient;
   receiving a response masking message with a response secret message from a recipient's mobile device;
   copying the response masking message and detecting the response secret message by checking a clipboard content;
   decrypting the response secret message; and
   decoding the secret message and rendering it on a sender's keyboard screen,
   wherein the secret message contains an invisible marker inserted after a first symbol of the masking message for detection and decoding, wherein the invisible marker contains a time of generation of the secret message and a length of the secret message.

2. The method of claim 1, further comprising randomly selecting a quick phrase from a list of common phrases.

3. The method of claim 1, further comprising performing semantic analysis of the secret message and automatically selecting a quick phrase based on the semantic analysis.

4. The method of claim 1, further comprising generating an identifier (ID) of the secret message using invisible symbols and embedding the secret message ID into the masking message.

5. The method of claim 4, further comprising saving a secret message into a remote database for subsequent retrieval by the recipient based on the secret message ID and recipient's password and a biometric identifier.

6. The method of claim 1, further comprising encoding the secret message into invisible UTF8 control symbols.

7. The method of claim 1, further comprising embedding the secret message into a media file.

8. The method of claim 1, further comprising embedding the secret message into an emoji image or a symbol.

9. The method of claim 1, wherein the encrypting is implemented by a symmetric encryption using a key embedded into a secret messaging application.

10. The method of claim 1, wherein the encrypting is implemented by an asymmetric encryption using a key exchange protocol.

11. The method of claim 1, wherein a key exchange is implemented as a personalized key exchange.

12. The method of claim 1, wherein and a key exchange is implemented as a group key exchange over a common chat.

13. The method of claim 1, wherein and a key exchange is implemented using direct contact of mobile devices.

14. The method of claim 1, wherein a key exchange is implemented using a cloud-based PKI infrastructure employing a secure key exchange.

15. The method of claim 1, wherein and a key exchange is implemented using a voice sample from a user.

16. The method of claim 1, wherein and a key exchange is implemented using a biometric key derived from a biometric data of a user.

17. The method of claim 1, wherein the secret message is encrypted using biometric data acquired via a touch pad and wherein the secret message is encrypted without an explicit key exchange.

18. A system for hidden secret messages exchange between mobile devices, comprising:
   a mobile device having an operating system (OS); and
   a secret messenger keyboard extension installed on the OS, wherein the secret messenger keyboard extension is configured to:
   generate a masking message;
   receive a secret message;
   encrypt the secret message;

encode the secret message and embed it into the masking message;

send the masking message to another mobile device;

receiving another masking message with a response secret message from the another mobile device;

decrypt the response secret message;

decode the secret message and render the secret message on a keyboard screen, wherein the secret message contains an invisible marker inserted after a first symbol of the masking message for detection and decoding of the secret message, wherein the invisible marker contains a time of generation of the secret message and a length of the secret message.

19. The system of claim 18, wherein the secret messenger keyboard extension is further configured to randomly select a quick phrase from a list of common phrases.

20. The system of claim 18, wherein the secret message is encrypted using biometric data acquired via a touch pad and wherein the secret message is encrypted without an explicit key exchange.

\* \* \* \* \*